US011258367B2

(12) United States Patent
Mann et al.

(10) Patent No.: US 11,258,367 B2
(45) Date of Patent: Feb. 22, 2022

(54) POWER CONVERTER INCLUDING SELF POWERED HIGH VOLTAGE CHARGING OF A CONNECTED ENERGY STORAGE DEVICE

(71) Applicant: Hamilton Sundstrand Corporation, Charlotte, NC (US)

(72) Inventors: Jaspreet Kaur Mann, Solihull (GB); Andrew McLean, Halesowen (GB)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 0 days.

(21) Appl. No.: 16/713,372

(22) Filed: Dec. 13, 2019

(65) Prior Publication Data
US 2021/0075329 A1  Mar. 11, 2021

(30) Foreign Application Priority Data
Sep. 5, 2019  (EP) ..................................... 19250008

(51) Int. Cl.
*H02M 3/335* (2006.01)
*H02M 1/32* (2007.01)
(Continued)

(52) U.S. Cl.
CPC ......... *H02M 3/33569* (2013.01); *H02M 1/44* (2013.01); *H02M 3/155* (2013.01); *H02M 1/0096* (2021.05); *H02M 1/325* (2021.05)

(58) Field of Classification Search
CPC ..... H02M 3/33507–33592; H02M 2001/0096; H02M 2001/325; H02M 2001/0022
See application file for complete search history.

(56) References Cited

U.S. PATENT DOCUMENTS 4,893,227 A   1/1990  Gallios et al.
5,410,467 A *  4/1995  Smith .................. H02M 3/158
                                              363/131
(Continued)

FOREIGN PATENT DOCUMENTS

CN       104617763 A    5/2015
DE     102017213194 A1  1/2019
WO      2014064643 A2   5/2014

OTHER PUBLICATIONS

European Search Report for Application No. 19250008.0 filed Feb. 3, 2020, 19 pages.
(Continued)

*Primary Examiner* — Sisay G Tiku
(74) *Attorney, Agent, or Firm* — Cantor Colburn LLP (57) ABSTRACT

A power converter comprises a buck converter portion, an energy storage portion, and a controller. A first inductor is connected between the cathode of a first diode at an input node, and a capacitor at an output node. The input node is connected to an input voltage via a first switch. A second inductor in the energy storage portion is magnetically coupled to the first inductor and is connected to a second diode. The cathode of the second diode is connected to a first terminal of the energy storage element, and a second terminal of the energy storage element is connected to a second terminal of the second inductor. The first terminal of the energy storage element is connected to the input node via a second switch. When the input voltage is not less than a threshold, the second switch is opened.

19 Claims, 11 Drawing Sheets

(51) Int. Cl.
*H02M 1/00* (2006.01)
*H02M 1/44* (2007.01)
*H02M 3/155* (2006.01)

(56) References Cited

U.S. PATENT DOCUMENTS

| | | | |
|---|---|---|---|
| 5,552,695 A * | 9/1996 | Schwartz | G05F 1/40 |
| | | | 323/271 |
| 5,617,015 A | 4/1997 | Goder et al. | |
| 6,198,260 B1 * | 3/2001 | Wittenbreder | H02M 3/158 |
| | | | 323/271 |
| 6,304,065 B1 | 10/2001 | Wittenbreder | |
| 7,787,265 B2 | 8/2010 | Lim et al. | |
| 7,812,577 B2 | 10/2010 | Barthold | |
| 8,467,199 B2 | 6/2013 | Lee et al. | |
| 9,148,048 B2 | 9/2015 | Ekbote | |
| 9,985,540 B2 * | 5/2018 | Karlsson | H02M 3/33507 |
| 10,186,949 B1 | 1/2019 | Ferencz et al. | |
| 2002/0125864 A1 * | 9/2002 | Aiello | H02M 3/155 |
| | | | 323/267 |
| 2007/0007933 A1 * | 1/2007 | Chan | H02M 3/33569 |
| | | | 323/235 |
| 2010/0014330 A1 * | 1/2010 | Chang | H02M 1/4225 |
| | | | 363/89 |
| 2013/0027984 A1 * | 1/2013 | Takegami | H02M 3/3374 |
| | | | 363/21.01 |
| 2013/0106500 A1 | 5/2013 | Yin et al. | |
| 2017/0194868 A1 | 7/2017 | Choudhary et al. | |
| 2018/0301986 A1 * | 10/2018 | Alves | H02M 3/156 |
| 2020/0127553 A1 * | 4/2020 | Huang | H02M 7/217 |
| 2020/0127574 A1 * | 4/2020 | Huang | H02M 1/4258 |
| 2021/0044201 A1 * | 2/2021 | McLean | H02M 3/06 |
| 2021/0211053 A1 | 7/2021 | Fernandez-Mattos | |

OTHER PUBLICATIONS

European Search Report for Application No. 20275004.8, dated Jun. 29, 2020, 11 pages.

* cited by examiner

POWER CONVERTER INCLUDING SELF POWERED HIGH VOLTAGE CHARGING OF A CONNECTED ENERGY STORAGE DEVICE

CROSS-REFERENCE TO RELATED APPLICATIONS

This application claims the benefit of European Application 19250008.0 filed Aug. 5, 2019, the disclosure of which is incorporated herein by reference in its entirety.

TECHNICAL FIELD

This disclosure relates to a power supply circuit, in particular a power supply circuit suitable for aerospace and automotive electronic systems such as electric propulsion systems and/or air management systems.

BACKGROUND

Power supplies used in aerospace/automotive electronic systems, such as embedded electronic systems, must adhere to stringent Radio Frequency Emissions industry standards. Typical industry standards that form the basis of requirements are DO-160G and CISPR25 for aerospace and automotive systems respectively.

These power supplies act to take a supply voltage, such as a 28 VDC supply in an aerospace environment, and convert it to one or more application voltages, which are typically much lower.

Power supplies used in mobile electronics may be subject to electrical transients, which can result in either significantly high input voltages or power source interruption. Full function and performance is required for a defined period during interruption of the input power source. For 28 VDC fed aerospace power supplies, 'Lightning Insulation' requirements dictate that isolated topologies are utilized.

A power supply system is often arranged such that a series-connected energy storage unit such as a capacitor is employed to provide 'hold-up' capability. Those skilled in the art will appreciate that 'hold-up' capability means that power is maintained for a defined period of time in the event that the input voltage drops below a tolerable level or cuts out altogether.

As will be appreciated by those skilled in the art, the energy that a capacitor stores increases significantly with increased voltage, in accordance with the square law relationship between these parameters, i.e. $E=\frac{1}{2} CV^2$, where E is the energy stored, C is the capacitance of the hold-up capacitor, and V is the voltage applied to the capacitor. As will also be appreciated by those skilled in the art, the ratio between the physical volume of the capacitor and the energy it stores is lower at high voltages compared with lower voltages, so generally the physical volume of the capacitor increases as the energy storage requirements increase.

In order to achieve the necessary energy storage capability, hold-up capacitors known in the art per se are typically charged to voltage levels slightly higher than the input voltage by a dedicated series-connected converter. Conventional power supply architectures are often arranged as series-connected converter stages with multiple downstream Point Of Load (POL) power converters. The hold-up capacitor is typically charged by an upstream converter, which creates an 'intermediate bus'.

The hold-up capacitor voltage generally influences the design of downstream converters, requiring them to operate from this higher intermediate bus voltage level for a significant percentage of ON time. Despite this, the magnitude of energy storage required often results in the use of capacitor technology susceptible to freezing at low temperatures and/or damage at low pressure/high altitude. This combination of challenging constraints can not only result in the non-optimal selection of converter discrete switch rating and transformer turns ratio, but also drive the use of electrolytic capacitors for the energy storage function. Consequently, this restricts the lower temperature and/or altitude at which energy function can be used. Such conventional arrangements also require significant mechanical support due to the associated volume and shape of the capacitor(s).

BRIEF DESCRIPTION

In accordance with a first aspect, the present disclosure provides a power converter that includes: a buck converter portion comprises a first diode, a first inductor, and a capacitor. The buck converter portion is arranged such that a first terminal of the first inductor is connected to a cathode of the first diode at an input node, a second terminal of the first inductor is connected to a first terminal of the capacitor at an output node, and an anode of the first diode is connected to a second terminal of the capacitor at a first ground node, wherein the input node is connected to an input voltage via a first switch, and wherein the buck converter portion is arranged to supply an output voltage at the second terminal of the inductor. The converter also includes an energy storage portion comprising a second diode, an energy storage element, and a second inductor magnetically coupled to the first inductor, said energy storage portion being arranged such that a first terminal of the second inductor is connected to an anode of the second diode, a cathode of the second diode is connected to a first terminal of the energy storage element, and a second terminal of the energy storage element is connected to a second terminal of the second inductor, wherein the first terminal of the energy storage element is connected to the input node via a second switch. The converter also includes a controller arranged such that: when the input voltage is not less than a threshold value, the controller operates the power converter in a first mode in which a first pulse width modulation signal is applied to the first switch and the second switch is opened; and when the input voltage is less than the threshold value, the controller operates the power converter in a second mode in which the first switch is opened and a second pulse width modulation signal is applied to the second switch.

Thus it will be appreciated that examples of the present disclosure provide an improved power converter that may provide self-powered high voltage charging of a localized parallel-connected energy storage device to mitigate input voltage interruptions. In the topology provided by the present disclosure, the energy storage function is distributed, rather than centralized, i.e. the power converter has its own local energy storage function rather than relying on the centralized energy storage as in the case of conventional arrangements. This advantageously permits power to be routed to essential (e.g. system critical) functions while not providing power to non-essential functions, enabling reduced cost, weight and capacitor volume. The power converter of the present disclosure may, by way of example, be used as a POL converter.

In turn, this may provide increased degrees of freedom regarding choice of capacitor technology for harsh application environments, e.g. non-electrolytic capacitors may be used instead of electrolytic capacitors, where non-electrolytic capacitors are preferred for low temperature and/or low pressure conditions.

When selecting specific active devices such as the first and second switches for use in the power converter, the present disclosure may also advantageously allow for selection of devices that are optimized for 'normal' operation (i.e. when hold-up functionality is not required).

It will be appreciated that there are a number of different energy storage elements, known in the art per se, that could be used in the energy storage portion. However, in some preferred examples, the energy storage element comprises a hold-up capacitor. In preferred examples, the energy storage element comprises a non-electrolytic capacitor.

In some examples, the cathode of the second diode is connected to the first terminal of the energy storage element via a resistor. Such arrangements provide for 'trickle charging' of the energy storage element. This resistor may also advantageously slow the charging of the energy storage element in the hold-up mode, i.e. when the input voltage is below the threshold.

In some examples, the power converter further comprises an input voltage sense unit arranged to determine a magnitude of the input voltage and to supply said determined magnitude to the controller, such that the controller compares the determined magnitude of the input voltage to the threshold value. Such an input voltage sense unit advantageously provides a mechanism to determine the value of the input voltage. In some examples, the controller may comprise the input voltage sense unit, however the input voltage sense unit may be separate to the controller in other examples.

In some potentially overlapping examples, the power converter further comprises an output voltage sense unit arranged to determine a magnitude of the output voltage and to supply said determined magnitude to the controller, wherein the controller compares the determined magnitude to a reference value and adjusts at least one of the first and second PWM signals based on a difference between the determined magnitude and a reference value. The reference value acts as a 'set point', i.e. to achieve the desired value of the output voltage. Such a voltage sense unit advantageously provides a mechanism to determine the value of the output voltage. The controller may adjust the duty cycle and/or frequency of the PWM signals as appropriate in order to drive the output voltage toward the target output voltage in a manner known in the art per se.

By opening and closing the switches, it will be understood that these mean breaking and making the switch respectively. In other words, an 'open' switch is off (i.e. non-conducting) while a 'closed' switch is on (i.e. conducting). In some examples, the controller comprises a PWM generator arranged to produce the first and second PWM signals. The controller may comprise a switch drive unit that, in some examples, produces and supplies respective control signals that open and close the first and second switches as appropriate. This switch drive unit may, in a set of such examples, receive the first and second PWM signals and apply these to the first and second switches in the first second modes as appropriate.

The first and second PWM signals may be separate PWM signals or may be the same PWM signal that is simply routed to the appropriate switch in the mode being implemented by the controller, i.e. there may not, at least in some examples, be two distinct PWM signals that coexist.

Preferably, the power converter has means to prevent current flowing the wrong way through the circuit, e.g. back to the supply voltage. In some examples, the power converter comprises a forward bias diode connected between the input voltage and the input node. This protective forward bias diode acts to prevent a 'back flow' of current to the input voltage.

It will be appreciated by those skilled in the art that the principles of the present invention may be applied to systems with any suitable input and output voltage requirements. However, in some examples, the input voltage is between 10 V and 50 V, preferably between 20 V and 40 V, preferably between 25 V and 30 V, and may, for example, be 28 V. In some potentially overlapping examples, the output voltage is between 1 V and 10 V, preferably between 2 V and 8 V, and may, for example, be 3 V or 5 V.

When viewed from a second aspect, the disclosure also provides a power supply circuit comprising: a filter portion arranged to receive a system input voltage and to filter said system input voltage, thereby generating a filtered system input voltage; a flyback transformer comprising a primary winding and a secondary winding, wherein the filtered system input voltage is fed through the primary winding thereby generating an isolated input voltage; and a power converter. The power converter comprises: a buck converter portion comprises a first diode, a first inductor, and a capacitor, said buck converter portion being arranged such that a first terminal of the first inductor is connected to a cathode of the first diode at an input node, a second terminal of the first inductor is connected to a first terminal of the capacitor at an output node, and an anode of the first diode is connected to a second terminal of the capacitor at a first ground node, wherein the input node is connected to the isolated input voltage via a first switch, and wherein the buck converter portion is arranged to supply an output voltage at the second terminal of the inductor. The converter also include an energy storage portion comprising a second diode, an energy storage element, and a second inductor magnetically coupled to the first inductor, said energy storage portion being arranged such that a first terminal of the second inductor is connected to an anode of the second diode, a cathode of the second diode is connected to a first terminal of the energy storage element, and a second terminal of the energy storage element is connected to a second terminal of the second inductor, wherein the first terminal of the energy storage element is connected to the input node via a second switch. The converter also includes a controller arranged such that: when the isolated input voltage is not less than a threshold value, the controller operates the power supply circuit in a first mode in which a first pulse width modulation signal is applied to the first switch and the second switch is opened; and when the isolated input voltage is less than the threshold value, the controller operates the power supply circuit in a second mode in which the first switch is opened and a second pulse width modulation signal is applied to the second switch.

In some examples, the power supply circuit comprises a plurality of power converters. In such examples, each power converter has its own localized energy storage function, thus providing a power supply circuit with distributed—rather than centralised—energy storage.

As outlined previously, conventional power supply circuit arrangements, known in the art per se, use a series-connected energy storage portion, such as a capacitor, upstream of the power converter(s) to provide power when the input voltage drops below a certain threshold. While the provision of the parallel energy storage in the power converter in accordance with examples of the present disclosure means that the series-connected energy storage is no longer necessary, in some examples a series-connected decoupling capacitor is connected between the flyback transformer and the power converter(s). For example, the series-connected decoupling capacitor may be connected across the input voltage. While the decoupling capacitor could store some energy, in such examples, the primary energy storage functionality is carried out within the power converter(s).

Optional features described hereinabove in relation to the first aspect of the disclosure apply equally, as appropriate, to the second aspect of the disclosure.

BRIEF DESCRIPTION OF THE DRAWINGS

Certain examples of the present disclosure will now be described with reference to the accompanying drawings, in which.

DETAILED DESCRIPTION

Figure 1:
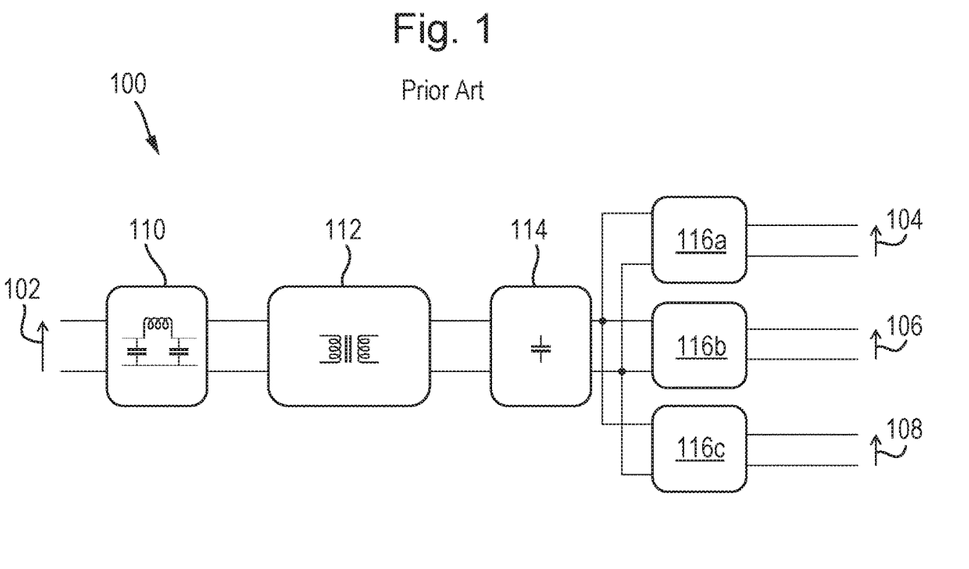
FIG. 1 is block diagram of a prior art power supply circuit.

FIG. 1 is block diagram of a prior art power supply circuit 100 arranged to receive an input voltage 102 and produce a number of output voltages 104, 106, 108. In general, the circuit 100 may provide N output voltages, however only three are shown for ease of illustration.

The power supply circuit 100 of FIG. 1 comprises an electromagnetic compatibility (EMC) filter 110, a flyback stage 112, series-connected energy storage 114, and a number of power converters 116a-c, one for each output voltage 104, 106, 108. The flyback stage 112 and POL converters 116a-c, in effect, provide a two-stage converter architecture in order to provide 'hold-up' capability, i.e. so that the circuit 100 can maintain the output voltages 104, 106, 108 at their required value, even if the input supply 102 drops low or to zero (i.e. in the case of a brownout, slump, or loss of power).

The flyback converters stage 112 and the power converters 116a-c within the circuit 100 of FIG. 1 will make use of discontinuous input currents, which will typically give rise to unwanted interference that can have a detrimental effect on surrounding circuitry. Conducted Emission requirements specify that this must be minimized, and so the EMC filter 110 is included at the power supply input (i.e. connected to the input supply 102) in order to satisfy the Conducted Emission requirements arising from the large pulsating supply currents associated with the flyback stage 112 and power converters 116a-c that are in use.

The series-connected energy storage 114 is, in practice, a capacitor which stores charge in one cycle of the circuit 112, and releases that charge in another cycle. Those skilled in the art will appreciate that the energy stored in a capacitor follows the characteristic equation $E=\frac{1}{2} CV^2$, where E is energy, C is capacitance, and V is the voltage across the capacitor. Accordingly, the output voltage of the flyback stage 112 is stepped up compared to its input voltage for storage on the capacitor. If the supply voltage 102 is lost or degraded, the capacitor (i.e. the energy storage 114) releases its stored energy, supplementing the loss of the supply voltage 102. Thus the capacitor of the energy storage portion 114 is, in effect, a 'hold-up' capacitor. Stepping up the voltage across the capacitor in this way has a significant impact on the amount of energy stored.

The first output voltage 104 is sensed by a feedback loop (not shown), which controls operation of the power converters 116a-c so as to drive the first output voltage 104 to a desired set point. Typically this is achieved by controlling the duty cycle of signals applied to a buck stage converter within the power converters 116a-c so as to discontinuously draw current from the input supply at a rate that leads to an output voltage of the desired magnitude. The hold-up capacitor 114 is typically charged by an upstream converter, which creates an 'intermediate bus'.

In order to achieve the necessary energy storage capability, the centralized hold-up capacitor is typically charged to a voltage level slightly higher than the input voltage 102. The hold-up capacitor voltage magnitude generally influences the design of the downstream power converters 116a-c, requiring them to operate from this higher intermediate bus voltage level for a significant percentage of on-time. In order to provide the desired magnitude of energy storage, the capacitor in the energy storage portion 114 is typically an electrolytic capacitor. However, electrolytic capacitors are susceptible to freezing at low temperatures and/or damage at low pressure/high altitude. These constraints may result in the non-optimal selection of switches in the power converters 116a-c with respect to their switch ratings, and may also result in the non-optimal selection of the transformer turns ratio. Consequently, this restricts the lower temperature and/or altitude at which energy function can be used. Such conventional arrangements also require significant mechanical support due to the associated volume and shape of the electrolytic capacitor.

Figure 2:
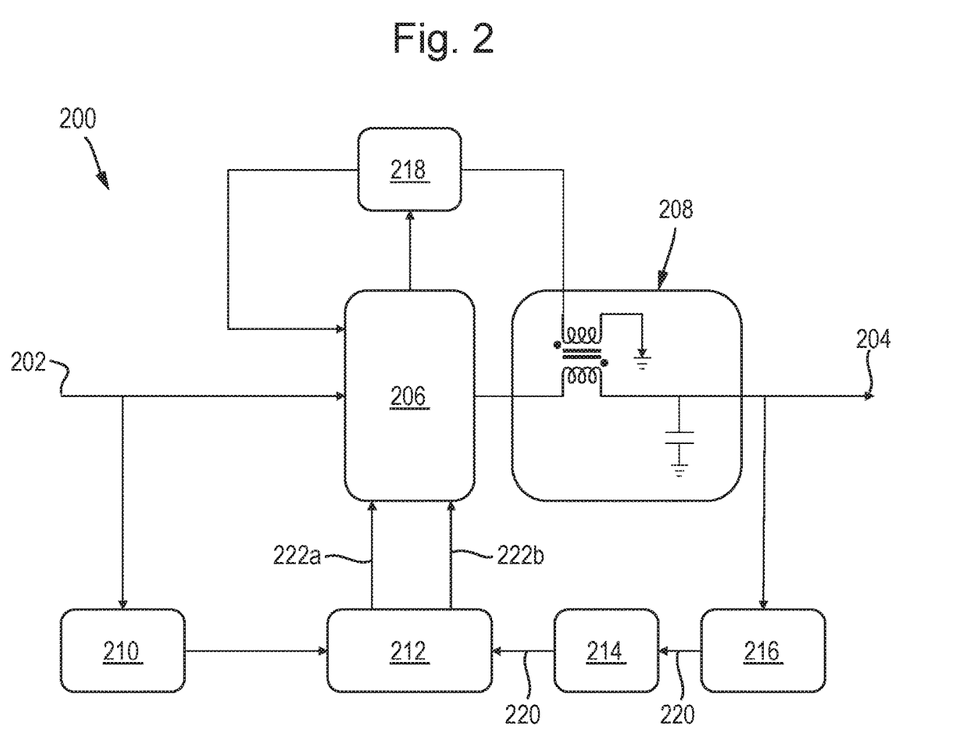
FIG. 2 is a block diagram of a power converter in accordance with an example of the present disclosure.

FIG. 2 is a block diagram of a power converter 200 in accordance with an example of the present disclosure. The power converter 200 of FIG. 2 is arranged to receive an input supply voltage 202 and produce an output voltage 204. By way of non-limiting example, the input supply voltage may be 28 VDC while the output voltage 204 may be 3 VDC or 5 VDC. The input supply voltage 202 may, in practice, be the voltage from the 'intermediate bus' upstream of the power converter 200.

The power converter 200 comprises: a two-input switch cell 206; a coupled inductor filter stage 208; an input voltage sense unit 210; a switch drive 212; a PWM controller 214; an output voltage sense unit 216; and a high voltage (HV) storage portion 218. These are described in further detail below with reference to FIG. 3.

Figure 3:
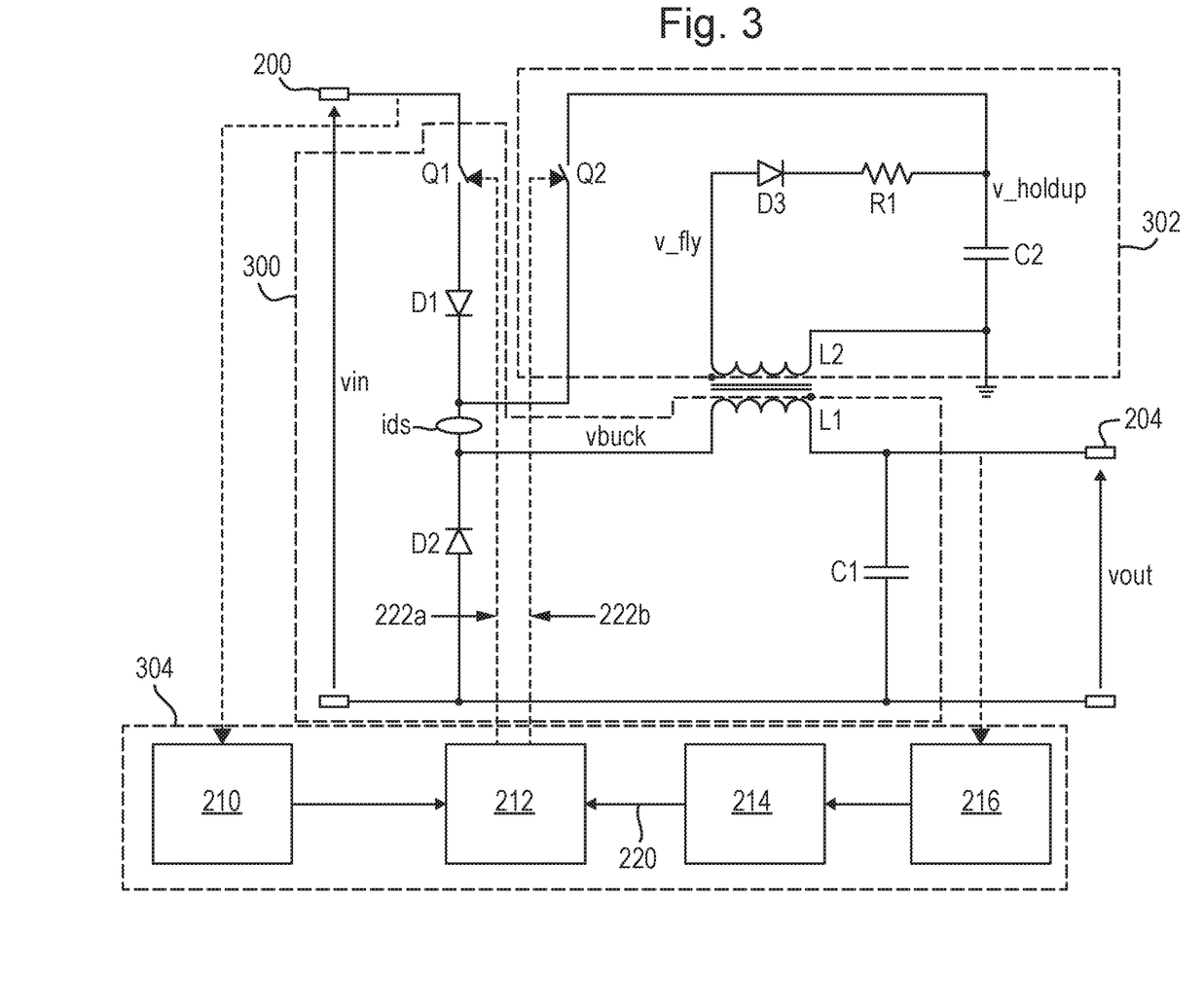
FIG. 3 is a circuit diagram of the power converter of FIG. 2.

FIG. 3 is a circuit diagram of the power converter 200 of FIG. 2. While the power converter 200 is a single circuit, for ease of reference the power converter 200 is divided logically into a buck converter portion 300 and an energy storage portion 302. The input voltage sense unit 210, switch drive 212, PWM controller 214, and output voltage sense unit 216 are also collectively grouped as a 'controller' 304 for ease of reference.

The buck converter portion 300 comprises: a switch Q1; two diodes D1, D2; an inductor L1; and a capacitor C1. One terminal of the first inductor L1 is connected to the cathode of the second diode D2 at an input node. The other terminal of the first inductor L1 is connected to a first terminal of the capacitor C1 at an output node. The anode of the second diode D2 is connected to the other terminal of the capacitor C1, and both of these are connected to ground. The input node is connected to an input voltage via the first switch Q1.

The energy storage portion 302 comprises: a diode D3; a capacitor (i.e. an energy storage element) C2; and a second inductor L2 which is magnetically coupled to the first inductor L1 in the buck converter portion 300. The energy storage portion 302 is arranged such that one terminal of the second inductor L1 is connected to the anode of the diode D3. The cathode of the diode D3 is connected to one terminal of the capacitor C2 via R1, and the other terminal of the capacitor C2 is connected to the second terminal of the second inductor L2. The first terminal of the capacitor C2 is connected to the input node via a second switch Q2.

As the parallel-connected hold-up capacitor C2 is localized to the individual power converter 200, rather than being centralized as a series-connected element (as in the prior art arrangement of FIG. 1), it can be smaller as it only needs to serve the load (not shown) connected to the power converter 200. As the hold-up capacitor C2 can be smaller, this allows the use of a non-electrolytic capacitor. Accordingly, the hold-up capacitor C2 may be e.g. a metalized ceramic chip capacitor or film capacitor rather than an electrolytic capacitor. As a non-electrolytic capacitor, the hold-up capacitor C2 is less susceptible to freezing in low temperature environments, and can handle lower pressure environments, than the electrolytic capacitor used in the series-connected energy storage portion 114 in the prior art power supply circuit 100 described above with reference to FIG. 1.

The controller 304 is arranged such that when the input voltage is not less than a threshold value, the controller 304 operates the power converter 200 in a first mode in which the first PWM signal 222a is applied to the first switch Q1 and the second switch Q2 is opened (i.e. switched off). Conversely, when the input voltage 202 is less than the threshold value, the controller 304 operates the power converter 200 in a second mode in which the first switch Q1 is opened and the second PWM signal 222b is applied to the second switch Q2.

The output voltage sense unit 216 senses the value of the output voltage 204 and sends a control signal 216 to the PWM controller 214. The PWM controller 214 sets the duty cycle of a pair of PWM control signals 222a, 222b, which are supplied to a pair of switches via the switch drive 212 as described in further detail with reference to FIG. 3. The value of the duty cycle of these PWM control signals 222a, 222b drives the output voltage 204 to a set point, in a manner known in the art per se.

Figure 4A:
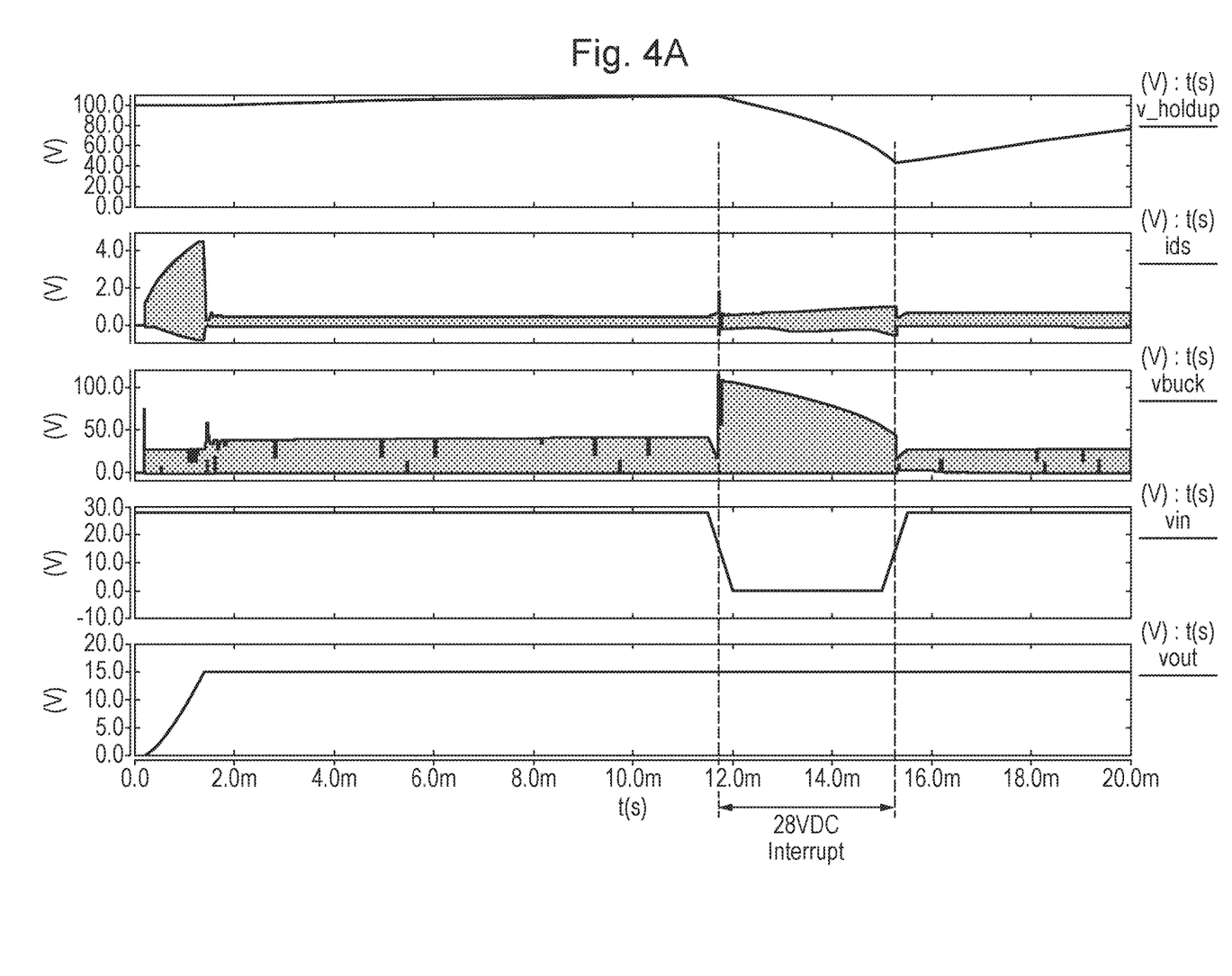
FIGS. 4A and 4B are graphs that show typical waveforms that illustrate an overview of operation of the power converter of FIG. 3.
Figure 4B:
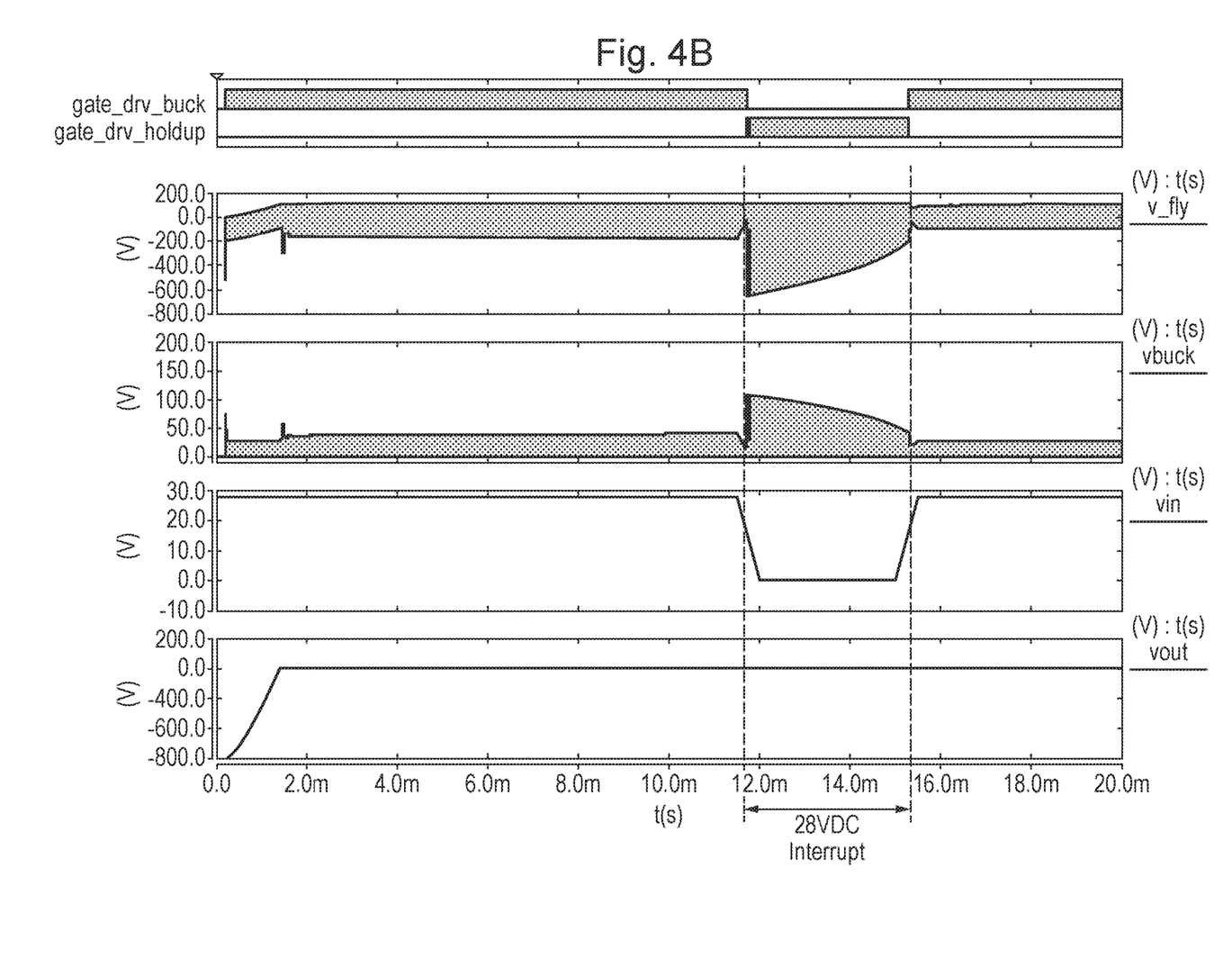

FIGS. 4A and 4B are graphs that show typical waveforms that illustrate an overview of operation of the power converter 200 of FIG. 3.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

From top to bottom, the plots shown in FIG. 4A are: the hold-up voltage $V_{hold-up}$; the current $i_{ds}$ flowing through the buck converter portion 300; the voltage $V_{buck}$ at the 'input' terminal of the first inductor L1; and the input voltage $V_{in}$ and output voltage $V_{out}$.

From top to bottom, the plots shown in FIG. 4B are: the drive voltage gate_drv_buck applied to the gate of Q1; the drive voltage gate_drv_holdup applied to the gate of Q2; the voltage $V_{fly}$ at the anode of the diode D3 in the energy storage portion 302; the voltage $V_{buck}$ at the 'input' terminal of the first inductor L1; and the input voltage $V_{in}$ and output voltage $V_{out}$.

As can be seen in FIGS. 4A and 4B, the power converter 200 provides a relatively stable output voltage $V_{out}$, even when there is an interrupt in the input voltage $V_{in}$. During the interrupt, the hold-up voltage $V_{hold-up}$ is used as the supply in lieu of the input voltage $V_{in}$. Over time, the hold-up voltage $V_{hold-up}$ reduces as the hold-up capacitor C2 discharges.

Figure 5A:
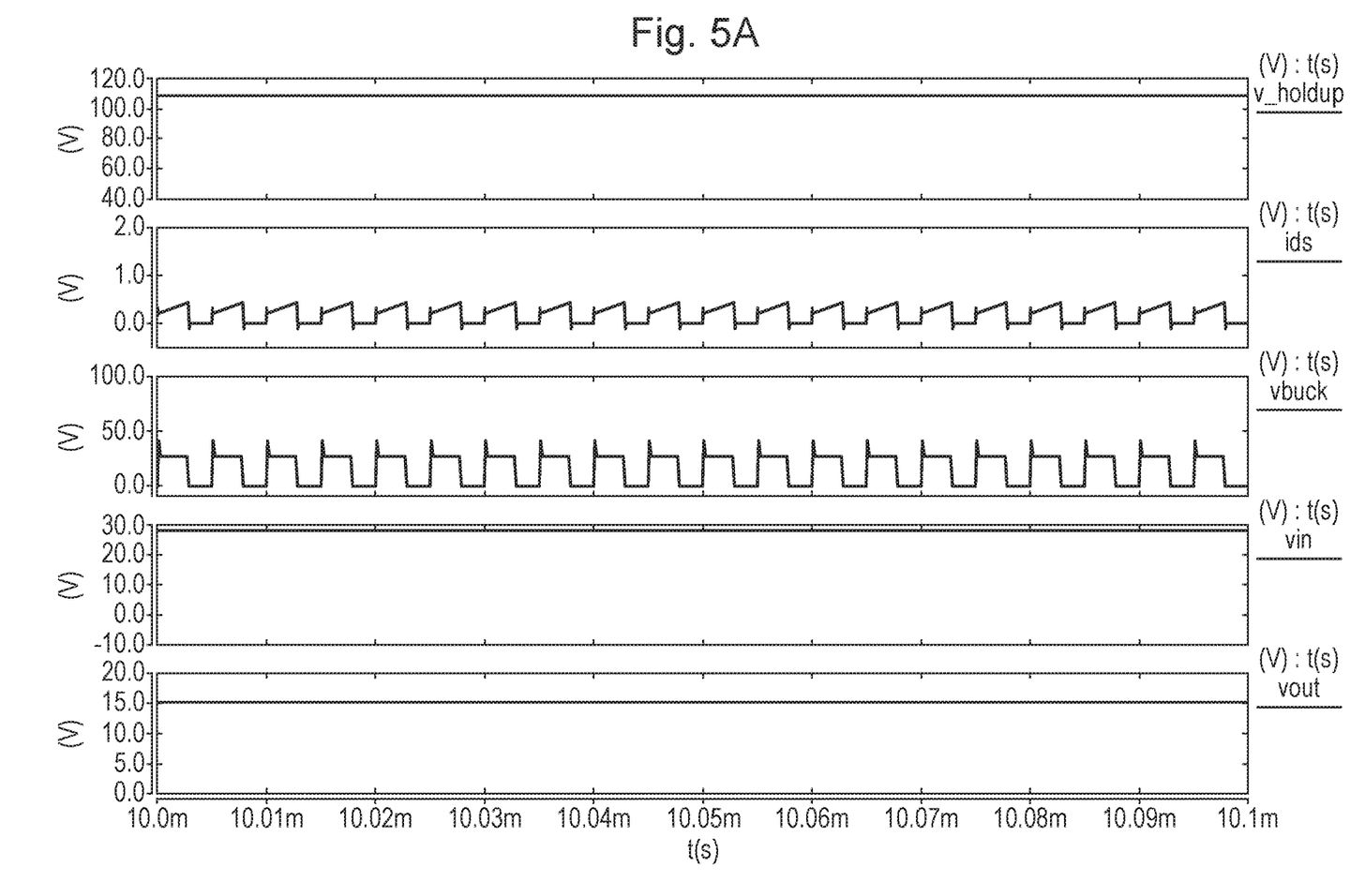
FIGS. 5A and 5B are graphs that show typical waveforms that illustrate an overview of operation of the power converter of FIG. 3 when operated in the normal mode.
Figure 5B:
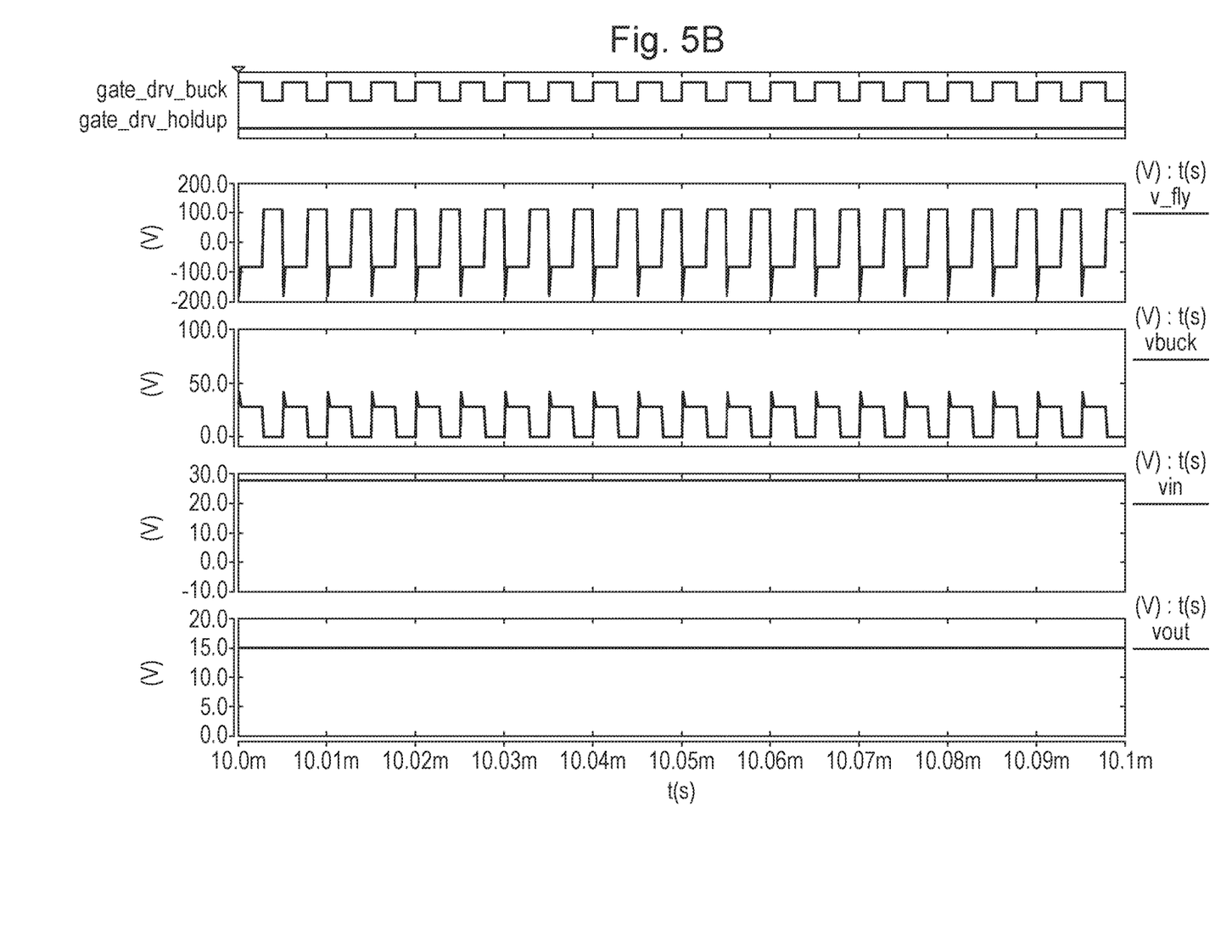

FIGS. 5A and 5B are graphs that show typical waveforms that illustrate an overview of operation of the power converter 200 of FIG. 3 when operated in the normal mode.

From top to bottom, the plots shown in FIG. 5A are: the hold-up voltage $V_{hold-up}$; the current $i_{ds}$ flowing through the buck converter portion 300; the voltage $V_{buck}$ at the 'input' terminal of the first inductor L1; and the input voltage $V_{in}$ and output voltage $V_{out}$.

From top to bottom, the plots shown in FIG. 5B are: the drive voltage gate_drv_buck applied to the gate of Q1; the drive voltage gate_dr_holdup applied to the gate of Q2; the voltage $V_{fly}$ at the anode of the diode D3 in the energy storage portion 302; the voltage $V_{buck}$ at the 'input' terminal of the first inductor L1; and the input voltage $V_{in}$ and output voltage $V_{out}$.

During normal operation, the input voltage input voltage $V_{in}$ remains stable and the voltage $V_{buck}$ at the input terminal of the first inductor L1 is 'pulsed' periodically so as to operate the buck converter portion 300 so as to convert the higher input voltage $V_{in}$ to the lower output voltage $V_{out}$. Due to the mutual inductance between the two inductors L1, L2, the pulsing of the voltage $V_{buck}$ at the input terminal of the first inductor L1 gives rise to pulses in the voltage $V_{fly}$ at the anode of the diode D3 in the energy storage portion 302. This voltage $V_{fly}$ then charges the hold-up capacitor C2, maintaining the hold-up voltage $V_{hold-up}$ at its steady state value.

Figure 6A:
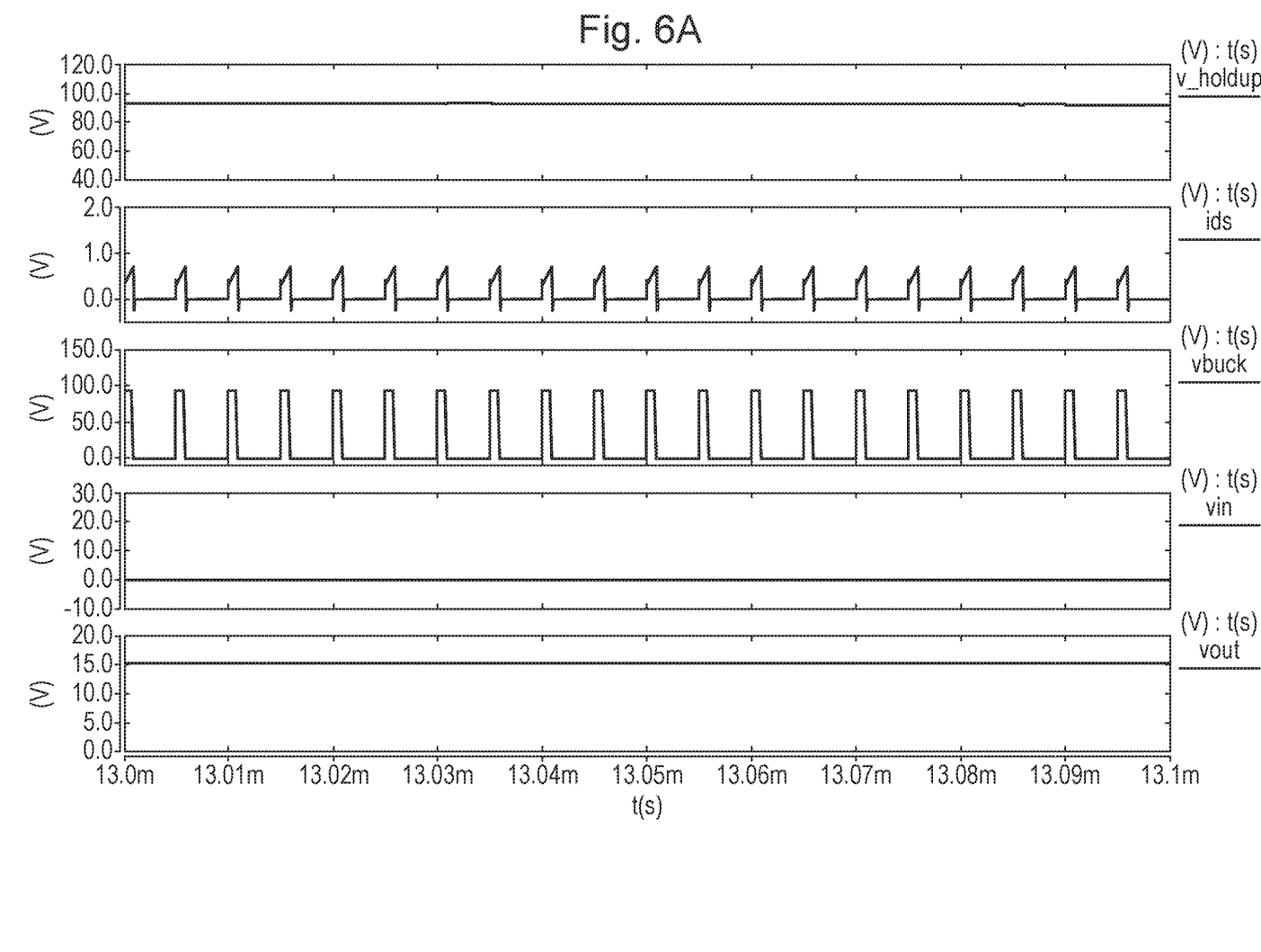
FIGS. 6A and 6B are graphs that show typical waveforms that illustrate an overview of operation of the power converter of FIG. 3 when operated in the hold-up mode.
Figure 6B:
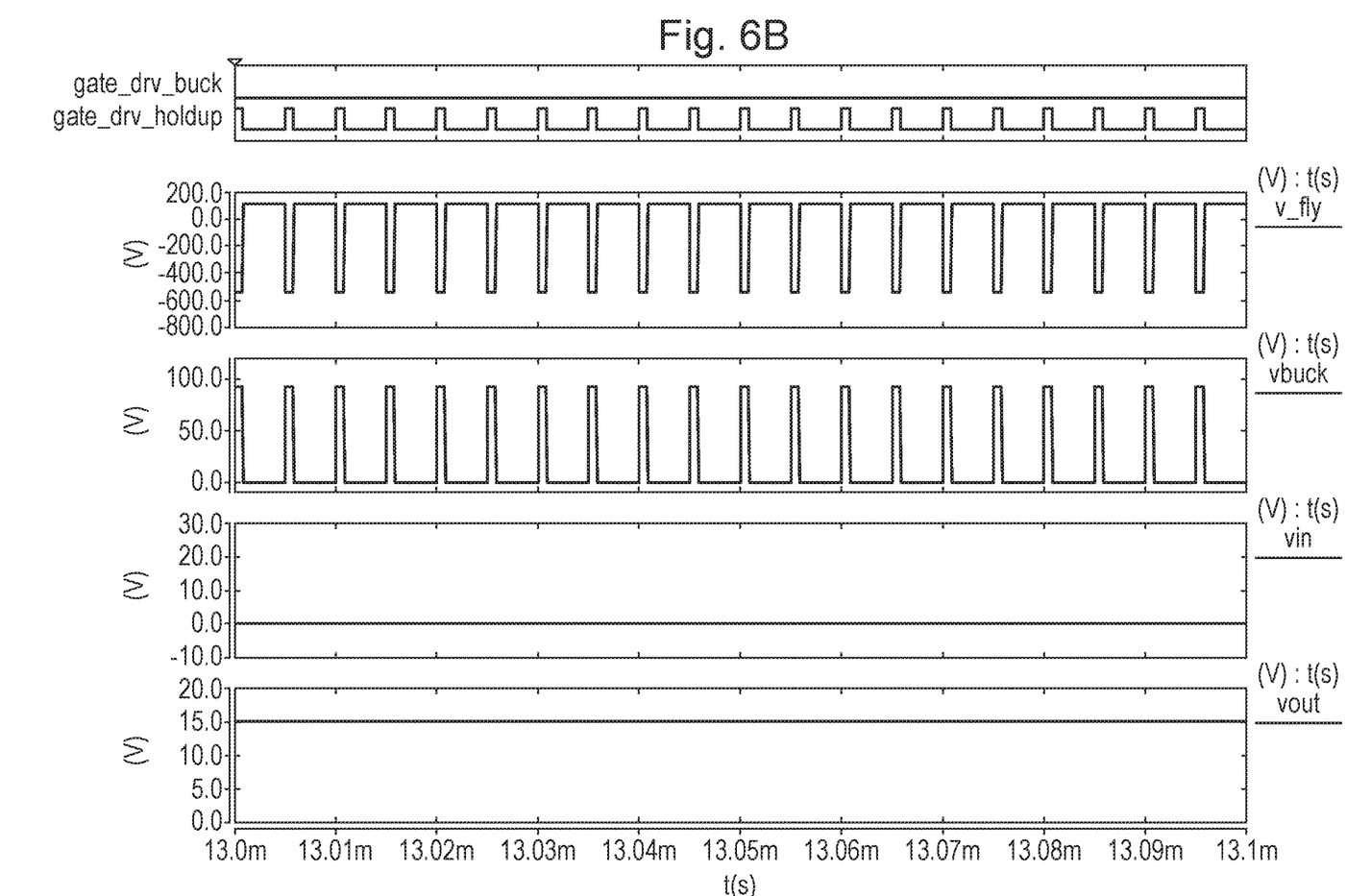

FIGS. 6A and 6B are graphs that show typical waveforms that illustrate an overview of operation of the power converter 200 of FIG. 3 when operated in the hold-up mode.

From top to bottom, the plots shown in FIG. 6A are: the hold-up voltage $V_{hold-up}$; the current ids flowing through the buck converter portion 300; the voltage $V_{buck}$ at the 'input' terminal of the first inductor L1; and the input voltage $V_{in}$ and output voltage $V_{out}$.

From top to bottom, the plots shown in FIG. 6B are: the drive voltage gate_drv_buck applied to the gate of Q1; the drive voltage gate_drv_holdup applied to the gate of Q2; the voltage $V_{fly}$ at the anode of the diode D3 in the energy storage portion 302; the voltage $V_{buck}$ at the 'input' terminal of the first inductor L1; and the input voltage $V_{in}$ and output voltage $V_{out}$.

During hold-up operation, the input voltage input voltage $V_{in}$ has fallen to zero. The voltage $V_{buck}$ at the input terminal of the first inductor L1 is 'pulsed' periodically so as to operate the buck converter portion 300 as in the normal operation described above with reference to FIGS. 4A and 4B. However, instead of the input voltage $V_{in}$, the buck converter portion 300 now takes the hold-up voltage $V_{hold-up}$ as the input via the second switch Q2. As such, the buck converter portion 300 instead acts to convert the hold-up voltage $V_{hold-up}$ to the lower output voltage $V_{out}$.

As before, due to the mutual inductance between the two inductors L1, L2, the pulsing of the voltage $V_{buck}$ at the input terminal of the first inductor L1 gives rise to pulses in the voltage $V_{fly}$ at the anode of the diode D3 in the energy storage portion 302. While this voltage $V_{fly}$ slightly charges the hold-up capacitor C2, it will be appreciated that the hold-up voltage $V_{hold-up}$ reduces over time as the buck converter portion 300 discharges the capacitor C2 faster than it is charged (only relatively small amount of energy is recovered during the hold-up mode).

Figure 7:
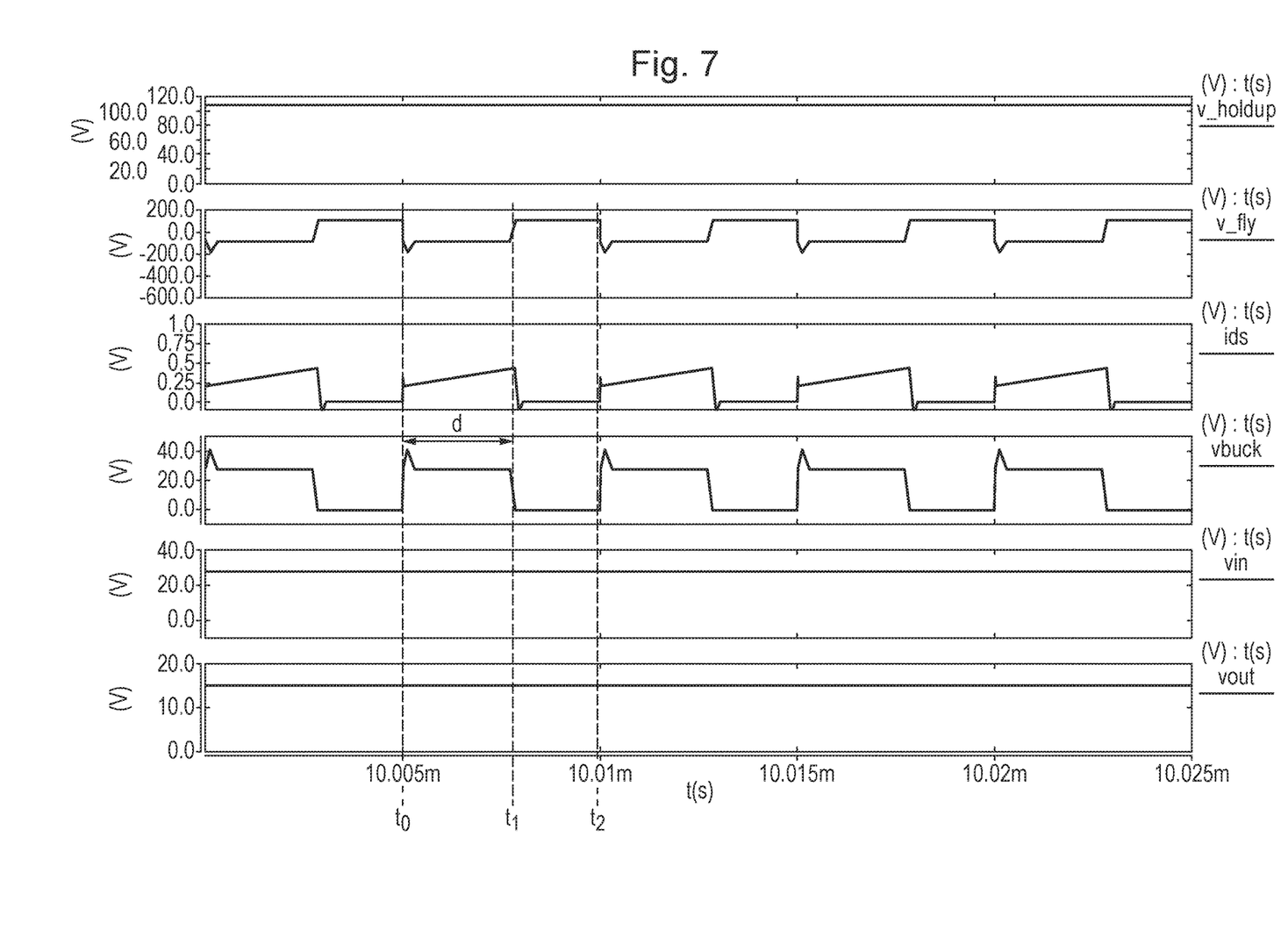
FIG. 7 is a graph that shows in detail the operation of the power converter of FIG. 3 when operated in the normal mode.

FIG. 7 is a graph that shows in detail the operation of the power converter 200 of FIG. 3 when operated in the normal mode. During the normal mode, the input voltage 202, which in this example is a 28 VDC input voltage, is monitored and the controller 304 operates the switches Q1, Q2 of the power converter 200 such that the first switch Q1 is controlled with the first PWM signal 222a, and the second switch Q2 is switched off. In this mode, D1 is forward biased.

Between t0 and t1, the output voltage 204 is sensed by the output voltage sense unit 216, and the difference between the determined magnitude and the reference voltage (i.e. the desired set point) is supplied as a control signal 220 to the PWM controller 214. The PWM controller 214 sets the duty cycle of a generated PWM signal 222 in accordance with the control signal 220 from the output voltage sense unit 216. The switch drive 212 takes the generated PWM signal 222 from the PWM controller 214 and generates the first and second PWM signals 222a, 222b.

When the sensed input voltage 202 is greater than the threshold, the normal mode is entered. In the normal mode, Q2 is disabled and the generated PWM signal 220 from the PWM controller 214 are routed to Q1 as the first PWM signal 222a. The Q1 'on period' represents the duty cycle, d.

At t0, the on-time commences, causing current in the first inductor L1 (i.e. within the buck converter portion 300) to rise at a rate governed by $(V_{in}-V_{out})/L1$. The current is delivered directly to the load whilst energy is stored in L1.

The two inductors L1, L2 act as a transformer, where L1 is the transformer's primary winding and L2 is the transformer's secondary winding. As can be seen from the 'dot notation' on the first and second inductors L1, L2, the 'secondary winding' is in antiphase with the 'primary winding'. As such, D3 is reverse biased.

At t1, Q1 is turned OFF, freewheeling diode D2 is forward biased and the energy stored in the inductor L1 is delivered to the output load and C1. During the period between t1 and t2, energy stored in coupled inductor L1 is also transferred Hold-up capacitor C2 via D3/R1. R1 is dimensioned to 'trickle charge' C2 to a regulated high voltage potential over many PWM cycles. L1 turns ratio determines the magnitude of the final Hold-up voltage. The stabilized Hold-up voltage is regulated since it is derived from the regulated output voltage 204 and the turns ratio of L1 to L2.

Figure 8:
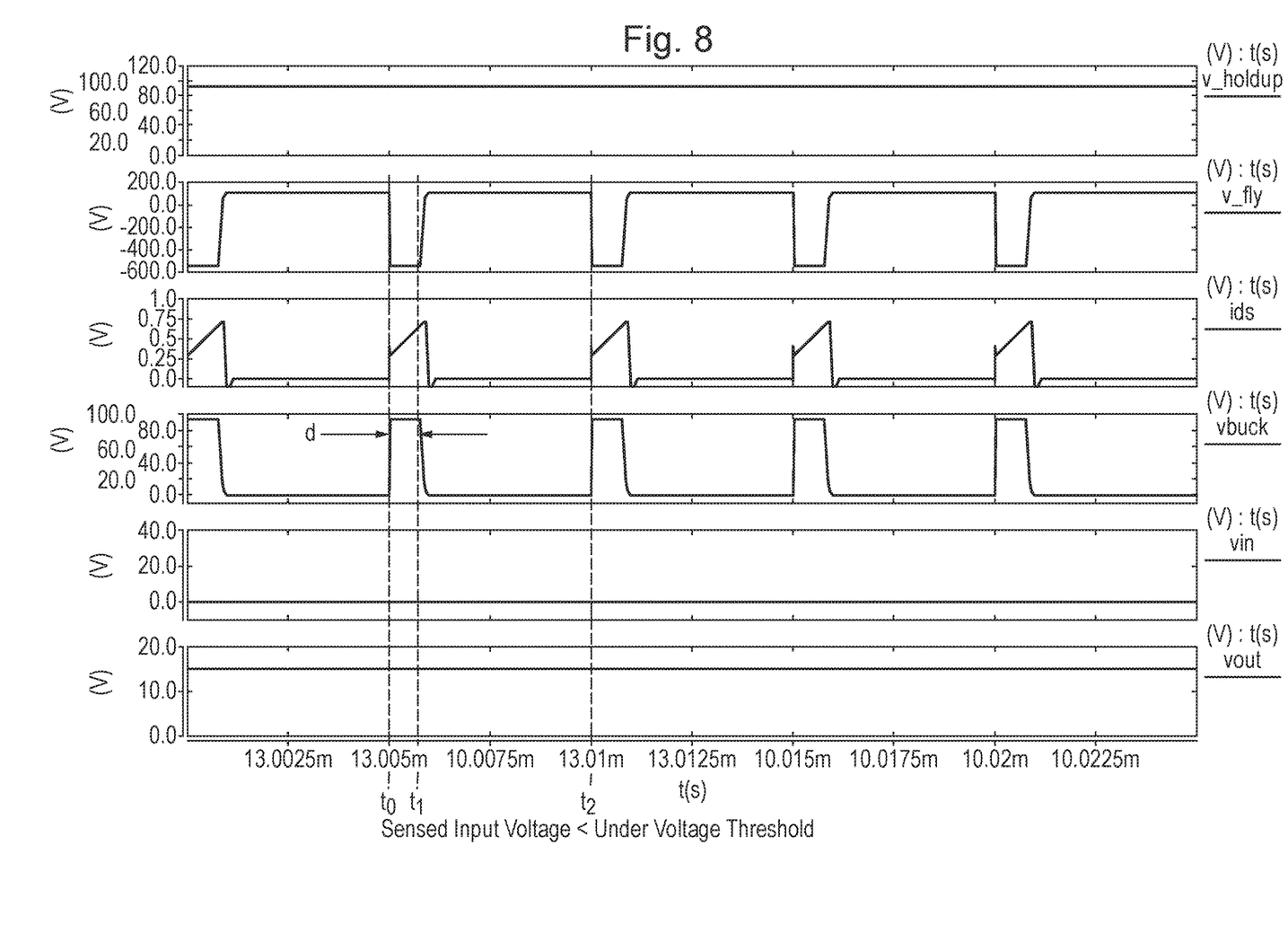
FIG. 8 is a graph that shows in detail the operation of the power converter of FIG. 3 when operated in the hold-up mode.

FIG. 8 is a graph that shows in detail the operation of the power converter 200 of FIG. 3 when operated in the hold-up mode. During the hold-up mode, the 28 VDC input voltage is monitored and the switch drive 212 opens Q1 and controls Q2 with PWM. During this time, the diode D1 acts a reverse voltage blocking device.

The switch drive 212 receives the generated PWM signal 220 from the PWM controller 214, which applies the second PWM signal 222b to the hold-up switch Q2. At t0, the input voltage sense unit 210 monitors the 28 VDC input voltage. When the sense input voltage 202 is less than the threshold, the second PWM signal 222b is applied to Q2 according to the duty cycle information provided by PWM controller 214. C2 is dimensioned to deliver load energy during the interrupt period, according to:

$$C2 = \frac{2\ E_{load}}{v_{initial}^2 - v_{final}^2}$$

where $E_{load}$ is the energy stored in the capacitor C2, and $V_{initial}$ and $V_{final}$ are the initial and final hold-up voltages respectively.

Figure 9:
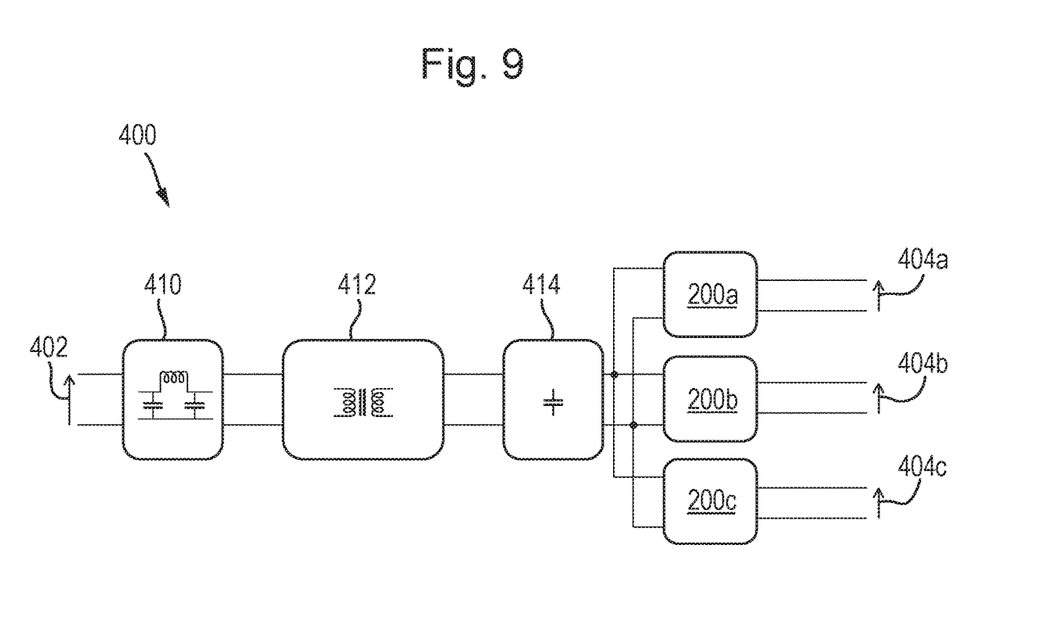
FIG. 9 is block diagram of a power supply circuit that implements the power converter of FIG. 3.

The power converter 200 of FIG. 2 may be used in place of one or more of the power converters 116a-c of FIG. 1 in order to provide an improved power supply circuit 400, as is shown in FIG. 9. In the power supply circuit 400 shown in FIG. 9, three power converters 200a-c are provided, each supplying a separate output voltage 404a-c to their respective loads (not shown).

The power supply circuit 400 of FIG. 1, arranged to receive an input voltage 402, also comprises an electromagnetic compatibility (EMC) filter 410, a flyback stage 412, and series-connected energy storage 414. The filter 410 and flyback stage 412 operate in a similar manner to that described above with reference to FIG. 1. However, the series-connected energy storage 414 no longer provides the centralized hold-up functionality as in the case of FIG. 1, as this function is now carried out locally within the power converters 200a-c. Instead, the series-connected energy storage 414 now behaves as a decoupling capacitor.

The local hold-up capacitors within the power converters 200a-c of the power supply circuit 400 may each be selected as appropriate for the load that they are to serve. Power critical loads may be connected to power converters 200a-c with larger (though potentially still non-electrolytic) capacitors while non-critical loads may be connected to a power converter with a smaller capacitor, or potentially one without local hold-up functionality if the load is not required in the case of a voltage interruption.

Thus it will be appreciated by those skilled in the art that examples of the present disclosure provide an improved power converter and associated power supply circuit that have a distributed, rather than a centralized, energy storage function, allowing power to be routed to power critical functions during an input voltage interruption (e.g. a drop or loss in the input voltage supply). Examples of the present disclosure may permit the use of smaller capacitors (in terms of their capacitance), thus allowing the use of non-electrolytic capacitors, which are preferred for use in e.g. aerospace applications where low temperature and low pressure operating conditions make the use of electrolytic capacitors undesirable.

While specific examples of the disclosure have been described in detail, it will be appreciated by those skilled in the art that the examples described in detail are not limiting on the scope of the disclosure.

What is claimed is:

1. A power converter comprising:
   a buck converter portion comprises a first diode, a first inductor, and a capacitor, said buck converter portion being arranged such that a first terminal of the first inductor is connected to a cathode of the first diode at an input node, a second terminal of the first inductor is connected to a first terminal of the capacitor at an output node, and an anode of the first diode is connected to a second terminal of the capacitor at a first ground node, wherein the input node is connected to an input voltage via a first switch, and wherein the buck converter portion is arranged to supply an output voltage at the second terminal of the inductor, the buck converter portion also including a forward bias diode connected between the input voltage and the input node wherein the input node is located between the cathode of the first diode and the forward bias diode;
   an energy storage portion comprising a second diode, an energy storage element, and a second inductor magnetically coupled to the first inductor, said energy storage portion being arranged such that a first terminal of the second inductor is connected to an anode of the second diode, a cathode of the second diode is connected to a first terminal of the energy storage element, and a second terminal of the energy storage element is connected to a second terminal of the second inductor, wherein the first terminal of the energy storage element is connected to the input node via a second switch; and
   a controller arranged such that:
   when the input voltage is not less than a threshold value, the controller operates the power converter in a first mode in which a first pulse width modulation signal is applied to the first switch and the second switch is opened; and
   when the input voltage is less than the threshold value, the controller operates the power converter in a second mode in which the first switch is opened and a second pulse width modulation signal is applied to the second switch.

2. The power converter as claimed in claim 1, wherein the energy storage element comprises a hold-up capacitor.

3. The power converter as claimed in claim 2, wherein the energy storage element comprises a non-electrolytic capacitor.

4. The power converter as claimed in claim 1, wherein the cathode of the second diode is connected to the first terminal of the energy storage element via a resistor.

5. The power converter as claimed in claim 1, further comprising an input voltage sense unit arranged to determine a magnitude of the input voltage and to supply said determined magnitude to the controller, such that the controller compares the determined magnitude of the input voltage to the threshold value.

6. The power converter as claimed in claim 5, wherein the output voltage is 3 V or 5 V.

7. The power converter as claimed in claim 1, further comprising an output voltage sense unit arranged to determine a magnitude of the output voltage and to supply said determined magnitude to the controller, wherein the controller compares the determined magnitude to a reference value and adjusts at least one of the first and second PWM signals based on a difference between the determined magnitude and the reference value.

8. The power converter as claimed in claim 1, wherein the controller comprises a PWM generator arranged to produce the first and second PWM signals.

9. The power converter as claimed in claim 1, wherein the controller comprises a switch drive unit that produces and supplies respective control signals that open and close the first and second switches as appropriate.

10. The power converter as claimed in claim 9, wherein the switch drive unit is arranged to receive the first and second PWM signals and to apply said first and second PWM signals to the first and second switches in the first second modes respectively.

11. The power converter as claimed in claim 1, wherein the input voltage is between 10 V and 50 V.

12. The power converter as claimed in claim 1, wherein the input voltage is between 20 V and 40 V.

13. The power converter as claimed in claim 1, wherein the input voltage 28 V.

14. The power converter as claimed in claim 1, wherein the output voltage is between 1 V and 10 V.

15. The power converter as claimed in claim 1, wherein the output voltage is between 2 V and 8 V.

16. A power supply circuit comprising:
   a filter portion arranged to receive a system input voltage and to filter said system input voltage, thereby generating a filtered system input voltage;
   a flyback transformer comprising a primary winding and a secondary winding, wherein the filtered system input voltage is fed through the primary winding thereby generating an isolated input voltage; and
   a power converter wherein the power converter comprises:
   a buck converter portion comprises a first diode, a first inductor, and a capacitor, said buck converter portion being arranged such that a first terminal of the first inductor is connected to a cathode of the first diode at an input node, a second terminal of the first inductor is connected to a first terminal of the capacitor at an output node, and an anode of the first diode is connected to a second terminal of the capacitor at a first ground node, wherein the input node is connected to the isolated input voltage via a first switch, and wherein the buck converter portion is arranged to supply an output voltage at the second terminal of the inductor, the buck converter portion also including a forward bias diode connected between the input voltage and the input node wherein the input node is located between the cathode of the first diode and the forward bias diode;
   an energy storage portion comprising a second diode, an energy storage element, and a second inductor magnetically coupled to the first inductor, said energy storage portion being arranged such that a first terminal of the second inductor is connected to an anode of the second diode, a cathode of the second diode is connected to a first terminal of the energy storage element, and a second terminal of the energy storage element is connected to a second terminal of the second inductor, wherein the first terminal of the energy storage element is connected to the input node via a second switch; and
   a controller arranged such that:
   when the isolated input voltage is not less than a threshold value, the controller operates the power supply circuit in a first mode in which a first pulse width modulation signal is applied to the first switch and the second switch is opened; and
   when the isolated input voltage is less than the threshold value, the controller operates the power supply circuit in a second mode in which the first switch is opened and a second pulse width modulation signal is applied to the second switch.

17. The power supply circuit as claimed in claim 16, comprising a plurality of power converters.

18. The power supply circuit as claimed in claim 17, comprising a series-connected decoupling capacitor is connected between the flyback transformer and the power converter.

19. The power supply circuit as claimed in claim 16, comprising a series-connected decoupling capacitor is connected between the flyback transformer and the power converter.

\* \* \* \* \*